UNITED STATES PATENT OFFICE.

ALBERT HILEMAN, OF HOLLIDAYSBURG, PENNSYLVANIA, ASSIGNOR TO HARRISON BROS. & CO., INC., OF PHILADELPHIA, PENNSYLVANIA, A CORPORATION OF PENNSYLVANIA.

PROCESS FOR MAKING BASIC SULFATE OF LEAD.

969,474.    Specification of Letters Patent.    Patented Sept. 6, 1910.

No Drawing.    Application filed April 24, 1907. Serial No. 370,064.

*To all whom it may concern:*

Be it known that I, ALBERT HILEMAN, a citizen of the United States, residing at Hollidaysburg, in the county of Blair and State of Pennsylvania, have invented a certain new and useful Process for Making Basic Sulfate of Lead, whereof the following is a specification.

The object of my invention is to obtain a basic sulfate of lead from normal sulfate of lead, which has been previously obtained by any desired process. The normal sulfate is, of course, a product well known in the arts, and readily obtainable, whereas, the processes heretofore employed in the manufacture of basic sulfate involved considerable detail and expense.

My invention is based upon the discovery that under certain conditions, a direct combination can be brought about between normal sulfate of lead and oxid of lead (litharge), by a process in which chemical, and possibly electro-chemical, actions of a somewhat obscure nature, are induced or modified by mechanical treatment.

I have found that when an intimate mixture of normal lead sulfate and litharge is actively boiled together, with a considerable volume of water, (although neither of the solid ingredients is soluble to any substantial extent) a combination between the two ingredients readily takes place. I believe this action to be due to a progressive dissociation of the individual lead salts and their progressive reunion into a new compound; this action taking place readily under the conditions designated, although manifest to little or no extent in the absence of heat and agitation.

I take say 100 parts of normal sulfate of lead, and 75 parts of litharge, both of the ingredients being in a comminuted condition. They are mixed in a large excess of water, say 500 parts, and the water is maintained at a boiling temperature while the mass is actively stirred until the yellow color of the litharge disappears and the color indicative of basic sulfate is attained, showing that the reaction is complete. The resultant product is allowed to settle, and may be filtered by means of any convenient press or otherwise treated as desired.

The above formula is given as a typical one, but without intention to limit the process thereto, since in practice the amounts of the respective ingredients may be varied to produce the desired degree of basicity in the final product.

I am aware that it is not new to employ a solution of acetate of lead in connection with roasted lead ore, and to subsequently treat the resultant product by means of carbonic acid. This method however, differs essentially from my process, in that the acetate of lead is wholly soluble and is utilized in the form of such a solution. The peculiarity of my process resides in the fact that although neither of the ingredients is substantially soluble in the hot aqueous medium, the desired combination can be brought about by the progressive action above described.

Having thus described my invention, I claim:—

The hereinbefore described process of making basic sulfate of lead which consists in chemically combining normal sulfate of lead with litharge, by agitating said ingredients in a substantially undissolved condition, in the presence of a hot liquid, substantially as set forth.

In testimony whereof, I have hereunto signed my name, at Philadelphia, Pennsylvania this twenty-third day of April 1907.

ALBERT HILEMAN.

Witnesses:
FRANK STUART CAVENS,
JAMES H. BELL.